(12) United States Patent
Yamada et al.

(10) Patent No.: US 9,311,936 B2
(45) Date of Patent: Apr. 12, 2016

(54) MAGNETIC RECORDING HEAD AND DISK DRIVE PROVIDED THEREWITH

(71) Applicant: Kabushiki Kaisha Toshiba, Minato-ku, Tokyo (JP)

(72) Inventors: Kenichiro Yamada, Tokyo (JP); Katsuhiko Koui, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/610,576

(22) Filed: Jan. 30, 2015

(65) Prior Publication Data

US 2015/0146323 A1    May 28, 2015

Related U.S. Application Data

(62) Division of application No. 13/565,418, filed on Aug. 2, 2012, now Pat. No. 8,976,490.

(30) Foreign Application Priority Data

Aug. 30, 2011    (JP) .................................. 2011-187567

(51) Int. Cl.
| | | |
|---|---|---|
| *G11B 5/127* | (2006.01) | |
| *G11B 5/35* | (2006.01) | |
| *G11B 5/00* | (2006.01) | |
| *G11B 5/31* | (2006.01) | |

(52) U.S. Cl.
CPC ................ *G11B 5/35* (2013.01); *G11B 5/1278* (2013.01); *G11B 5/315* (2013.01); *G11B 2005/0005* (2013.01); *G11B 2005/0024* (2013.01)

(58) Field of Classification Search
CPC ............. G11B 2005/0024; G11B 5/35; G11B 5/1278; G11B 5/315; G11B 2005/0005
USPC ........ 360/125.3, 125.31, 125.71, 125.74, 128
See application file for complete search history.

(56) References Cited

U.S. PATENT DOCUMENTS

| | | | |
|---|---|---|---|
| 7,760,472 | B2 | 7/2010 | Sato et al. |
| 7,957,098 | B2 | 6/2011 | Yamada et al. |
| 8,164,854 | B2 | 4/2012 | Takagishi et al. |

(Continued)

FOREIGN PATENT DOCUMENTS

| | | |
|---|---|---|
| JP | 2008-084482 | 4/2008 |
| JP | 2008-305486 | 12/2008 |

(Continued)

OTHER PUBLICATIONS

Japanese Office Action for corresponding Japanese Application No. 2011-187567, mailed Jan. 29, 2013, in 7 pages.

*Primary Examiner* — Adam B Dravininkas
(74) *Attorney, Agent, or Firm* — Knobbe, Martens, Olson & Bear LLP (57) ABSTRACT

According to one embodiment, a magnetic recording head includes a main pole configured to apply a recording magnetic field to a recording layer of a recording medium, a trailing shield opposed to the main pole with a write gap therebetween, and a high-frequency oscillator between the main pole and the trailing shield in a range of a width of the main pole in a track width direction, and configured to generate a high-frequency magnetic field. The high-frequency oscillator includes a spin injection layer, an intermediate layer, and an oscillation layer, and at least the oscillation layer comprises divided oscillation regions.

4 Claims, 8 Drawing Sheets

(56) References Cited

U.S. PATENT DOCUMENTS

| | | |
|---|---|---|
| 2005/0021977 A1 | 1/2005 | Oberst |
| 2005/0219771 A1 | 10/2005 | Sato et al. |
| 2008/0268291 A1 | 10/2008 | Akiyama et al. |
| 2009/0052095 A1 | 2/2009 | Yamada et al. |
| 2009/0080120 A1* | 3/2009 | Funayama et al. ............ 360/319 |
| 2009/0316304 A1 | 12/2009 | Funayama et al. |
| 2010/0027158 A1 | 2/2010 | Takagishi et al. |
| 2010/0073806 A1 | 3/2010 | Koui et al. |
| 2011/0018647 A1 | 1/2011 | Lee et al. |
| 2011/0242701 A1 | 10/2011 | Ohtake et al. |

FOREIGN PATENT DOCUMENTS

| | | |
|---|---|---|
| JP | 2009-070541 | 4/2009 |
| JP | 2009-080867 | 4/2009 |
| JP | 2010-040060 | 2/2010 |
| JP | 2010-079976 | 4/2010 |
| JP | 2011-029616 | 2/2011 |

* cited by examiner

MAGNETIC RECORDING HEAD AND DISK DRIVE PROVIDED THEREWITH

CROSS-REFERENCE TO RELATED APPLICATIONS

This application is a divisional of U.S. patent application Ser. No. 13/565,418, filed on Aug. 2, 2012, which is based upon and claims the benefit of priority from prior Japanese Patent Application No. 2011-187567, filed Aug. 30, 2011; the entire contents of these applications are incorporated herein by reference.

FIELD

Embodiments described herein relate generally to a magnetic recording head for perpendicular magnetic recording used in a disk drive and to a disk drive provided with this magnetic recording head.

BACKGROUND

A disk drive, such as a magnetic disk drive, comprises a magnetic disk, spindle motor, magnetic head, and carriage assembly. The magnetic disk is disposed in a case. The spindle motor supports and rotates the magnetic disk. The magnetic head reads data from and writes data to the magnetic disk. The carriage assembly supports the magnetic head for movement relative to the magnetic disk. A head section of the magnetic head comprises a recording head for writing and a read head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return pole or write shield pole, and coil. The return pole or write shield pole is located on the trailing side of the main pole with a write gap therebetween and configured to close a magnetic path that leads to a magnetic disk. The coil serves to pass magnetic flux through the main pole.

For the purpose of improving recording density, there is suggested a magnetic recording head adopting a high-frequency magnetic field assist recording system wherein a spin-torque oscillator is provided as a high-frequency oscillation element between a main pole and a return pole and a high-frequency magnetic field is applied to the magnetic recording layer from this spin-torque oscillator.

When using as the spin-torque oscillator an oscillator whose element size is as large as a dimension of the main pole in a track width direction, circularly-polarized high-frequency magnetic field intensity (c-Hac) of 410 (Oe) can be generated in a perpendicular magnetic recording layer if oscillation is excellently performed, but the oscillation is not excellently effected in reality, and oscillation of only approximately 180 (Oe) is carried out. It is considered that such a state occurs because a spin wave is excited on an oscillation layer of the spin-torque oscillator and energy is considerably lost. Further, since excitation of the spin wave is suppressed when the element size is reduced, the oscillation is excellent, but produced high-frequency magnetic field intensity is insufficient, and excellent high-frequency assist recording is difficult.

DETAILED DESCRIPTION

Various embodiments will be described hereinafter with reference to the accompanying drawings. In general, according to one embodiment, a magnetic recording head comprises: a main pole configured to apply a recording magnetic field to a recording layer of a recording medium; a trailing shield opposed to the main pole with a write gap therebetween; and a high-frequency oscillator between the main pole and the trailing shield in a range of a width of the main pole in a track width direction, and configured to generate a high-frequency magnetic field. The high-frequency oscillator comprises a spin injection layer, an intermediate layer, and an oscillation layer, and at least the oscillation layer comprises divided oscillation regions.

First Embodiment

Figure 1:
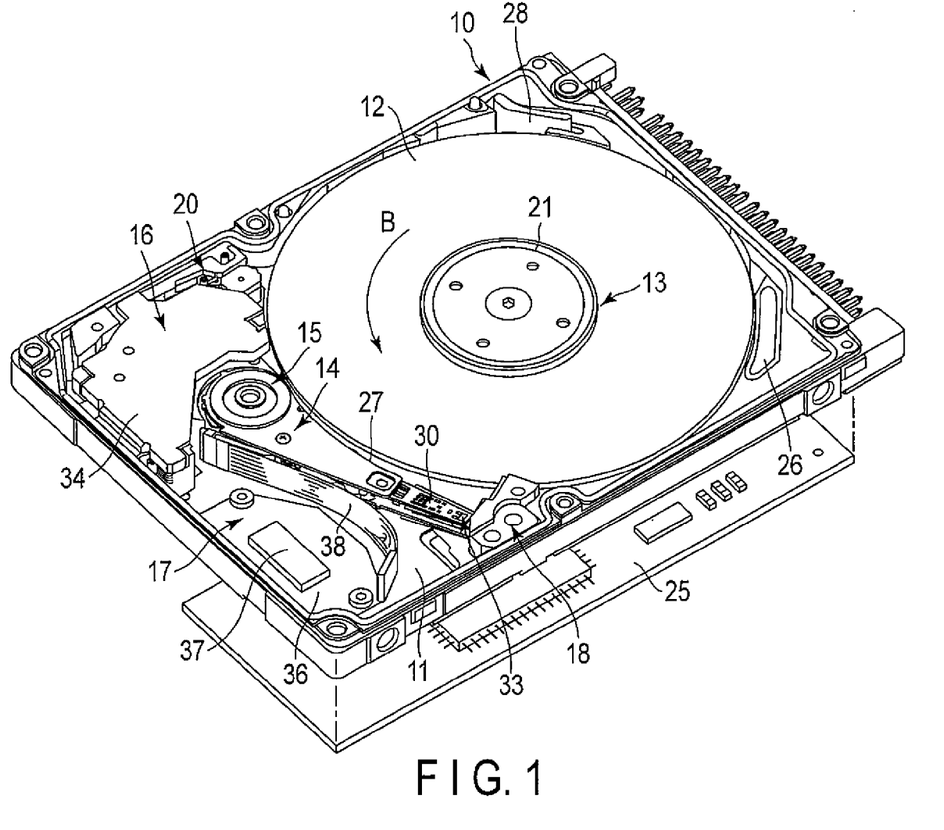
FIG. 1 is a perspective view showing a hard disk drive (referred to as an HDD hereinafter) according to a first embodiment.
Figure 2:
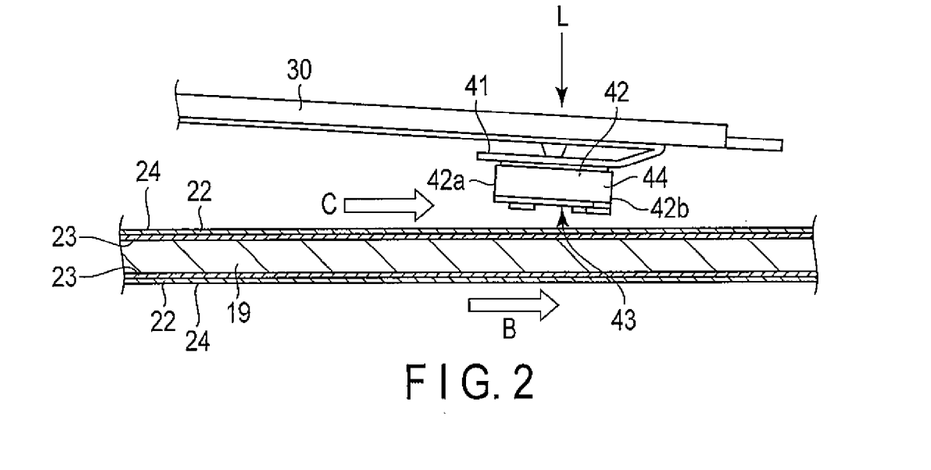
FIG. 2 is a side view showing a magnetic head and a suspension in the HDD.

FIG. 1 shows an internal configuration of an HDD as a disk drive according to a first embodiment with a top cover being removed, and FIG. 2 shows a magnetic head in a flying state. As shown in FIG. 1, the HDD comprises a housing 10. This housing 10 comprises an open-topped rectangular box-shaped base 11 and a non-illustrated rectangular tabular top cover. The top cover is screwed to the base using screws to close an upper end opening of the base. As a result, the inside of the housing 10 is air-tightly maintained and can communicate with outside for ventilation through a breather filter 26 alone.

A magnetic disk 12 as a recording medium and a drive unit are provided on the base 11. The drive unit comprises a spindle motor 13 that supports and rotates the magnetic disk 12, a plurality of (e.g., two) magnetic heads 33 that record and reproduce data on and from the disk 12, a head actuator 14 that supports these magnetic heads 33 for movement relative to the surfaces of the magnetic disk 12, and a voice coil motor (which will be referred to as a VCM hereinafter) 16 that rotationally moves and positions the head actuator. Further, on the base 11 are provided a ramp loading mechanism 18 that holds the magnetic heads 33 in a position off the magnetic disk 12 when the magnetic heads 33 are moved to the outermost periphery of the magnetic disk 12, an inertia latch 20 that holds the head actuator 14 in a retracted position if the HDD is jolted, for example, and a board unit 17 having electronic components such as a preamplifier, a head IC, and others mounted thereon.

A control circuit board 25 is attached to the outer surface of the base 11 by screws such that it faces a bottom wall of the base 11. The control circuit board 25 controls the operations of the spindle motor 13, the VCM 16, and the magnetic heads 33 through the board unit 17.

As shown in FIG. 1 and FIG. 2, the magnetic disk 12 is constituted as a perpendicular magnetic recording medium. The magnetic disk 12 is formed into a discoid shape having a diameter of, e.g., approximately 2.5 inches and has a board 19 made of a non-magnetic material. On each surface of the board 19 are sequentially laminated a soft magnetic layer 23 as an underlying layer and a perpendicular magnetic recording layer 22 having magnetic anisotropy in a direction perpendicular to the disk surface, and a protective film 24 is further formed thereon.

As shown in FIG. 1, the magnetic disk 12 is coaxially fitted on a hub of the spindle motor 13, clamped by a clamp spring 21 screwed at an upper end of the hub, and thereby fixed to the hub. The magnetic disk 12 is rotated in a direction of an arrow B at a predetermined speed by the spindle motor 13 as a drive motor.

The head actuator 14 comprises a bearing portion 15 fixed on a bottom wall of the base 11 and arms 27 extended from the bearing portion. These arms 27 are placed at predetermined intervals therebetween in parallel with the surface of the magnetic disk 12, and they are extended in the same direction from the bearing portion 15. The head actuator 14 includes an elastically deformable elongated plate-shaped suspension 30. A suspension 30 is constituted of a leaf spring, and its proximal end is fixed to an end of each arm 27 by spot welding or bonding and extended from each arm. The magnetic head 33 is supported at an extended end of each suspension 30 through a gimbal spring 41. The suspension 30, the gimbal spring 41, and the magnetic head 33 constitute a head gimbal assembly. It is to be noted that the head actuator 14 may be configured to comprise a so-called E block in which a sleeve of the bearing portion 15 and the arms are integrally formed.

As shown in FIG. 2, each magnetic head 33 has a slider 42 formed into a substantially rectangular parallelepiped shape and a recording/reproduction head portion 44 provided at an outflow end (a trailing end) of this slider. A head load L heading for the surface of the magnetic disk 12 is applied to each magnetic head 33 by elasticity of the suspension 30. Two arms 27 are placed in parallel at a predetermined interval therebetween, and the suspension 30 and the magnetic head 33 disposed to each of these arms face the counterparts to sandwich the magnetic disk 12 therebetween.

Each magnetic head 33 is electrically connected to a later-described main FPC 38 through a relay flexible printed circuit board (referred to as a relay FPC hereinafter) 35 fixed on the suspension 30 and the arm 27.

As shown in FIG. 1, the board unit 17 has an FPC main body 36 formed of a flexible printed circuit board and a main FPC 38 extended from this FPC main body. The FPC main body 36 is fixed on the bottom surface of the base 11. Electronic components including a preamplifier 37, a head IC, and others are mounted on the FPC main body 36. An extended end of the main FPC 38 is connected to the head actuator 14, and it is connected to the magnetic head 33 through each relay FPC 35.

The VCM 16 has a non-illustrated support frame extended from the bearing portion 15 in an opposite direction of the arm 27 and a voice coil supported by the support frame. In a state that the head actuator 14 is incorporated in the base 11, the voice coil is placed between a pair of yokes 34 fixed on the base 11, and the voice coil, these yokes, and magnets fixed to the yokes constitute the VCM 16.

In a state that the magnetic disk 12 is rotated, when the voice coil of the VCM 16 is energized, the head actuator 14 rotationally moves, and the magnetic head 33 is moved onto and positioned on a desired track of the magnetic disk 12. At this time, the magnetic head 33 is moved between an inner peripheral portion and an outer peripheral portion of the magnetic disk along a radial direction of the magnetic disk 12.

Figure 3:
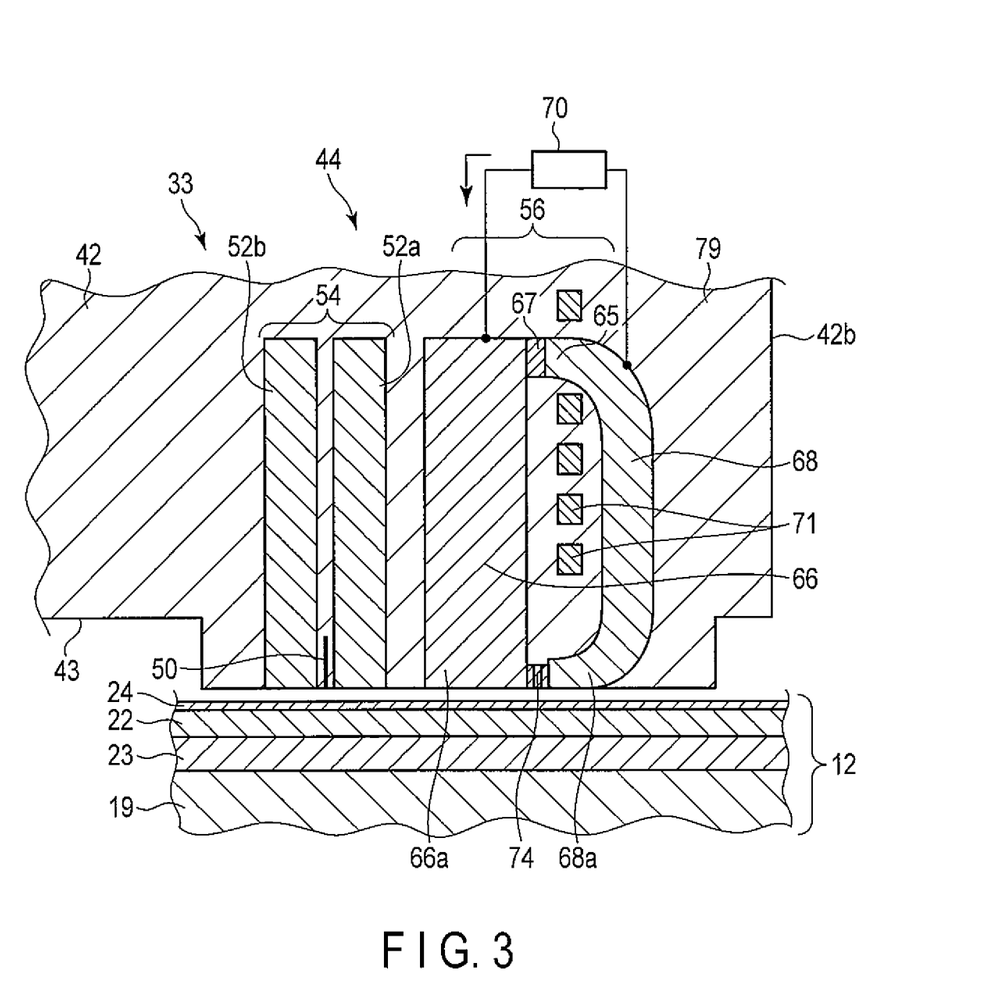
FIG. 3 is a cross-sectional view showing a head unit of the magnetic head in an enlarging manner.
Figure 4:
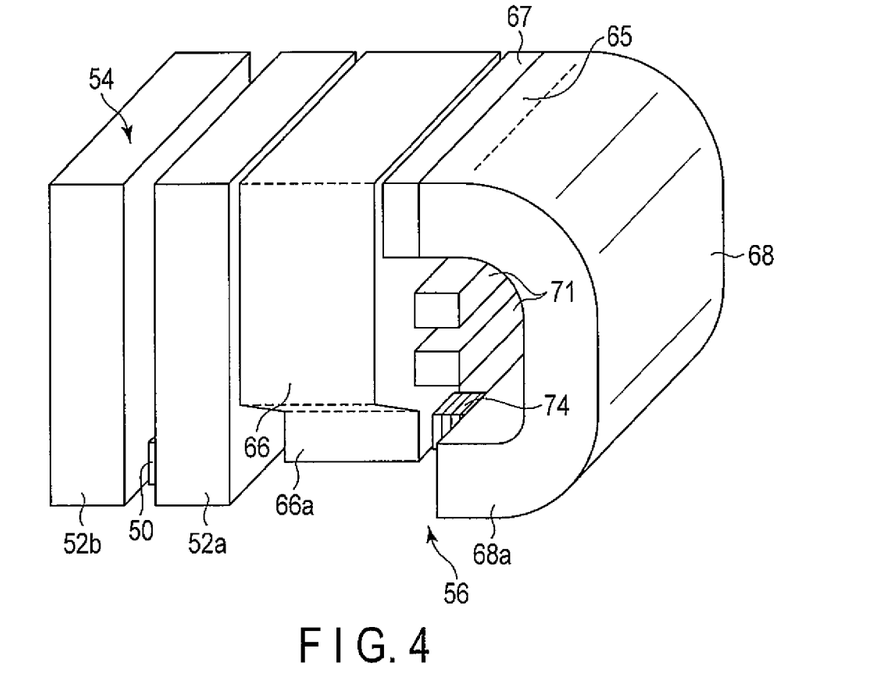
FIG. 4 is a perspective view schematically showing a recording head and a reproducing head.
Figure 5:
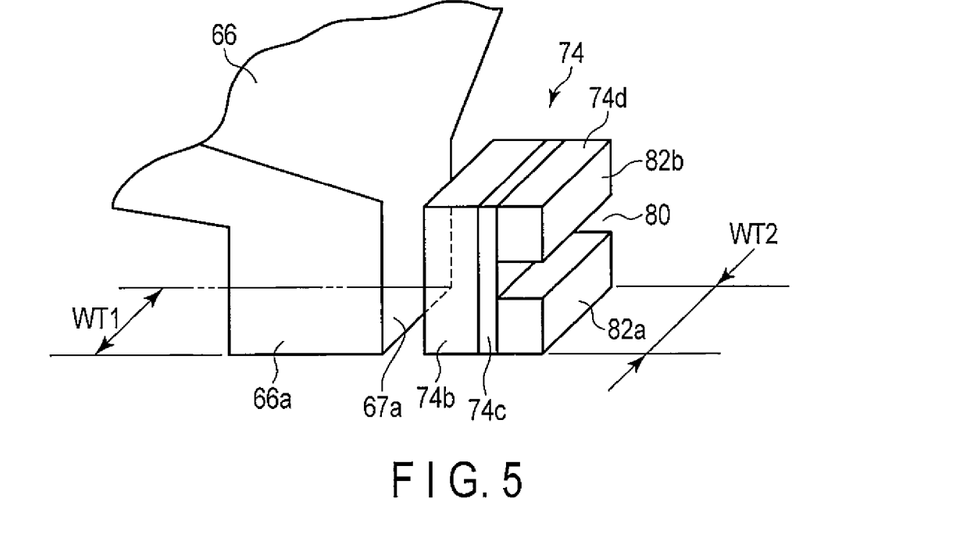
FIG. 5 is a perspective view showing a main pole end portion and a spin-torque oscillator of the recording head.
Figure 6:
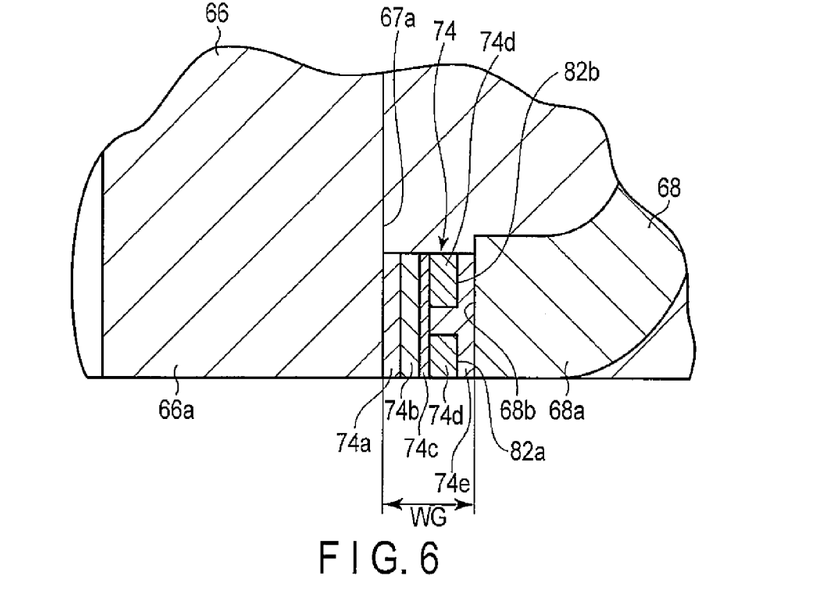
FIG. 6 is a cross-sectional view showing an end portion of the recording head on a magnetic disk side in an enlarging manner.

A configuration of the magnetic head 33 will now be described in detail. FIG. 3 is an enlarged cross-sectional view showing the head portion 44 of the magnetic head 33, FIG. 4 is a perspective view schematically showing a recording head and a reproducing head, FIG. 5 is an enlarged cross-sectional view showing an end portion of the recording head on the magnetic disk side, and FIG. 6 is a layout plan showing the recording head portion from an ABS surface side of the slider.

As shown in FIG. 2 and FIG. 3, the magnetic head 33 is constituted as a float type head and has a slider 42 formed into a substantially rectangular parallelepiped shape and a head portion 44 formed at an end portion of the slider on an outflow end (trailing) side. The slider 42 is formed of, e.g., a sintered compact (AlTiC) of alumina and a titanium carbide, and the head portion 44 is formed by laminating a thin film.

The slider 42 has a rectangular disk facing surface (an air bearing surface (ABS)) facing the surface of the magnetic disk 12. The slider 42 is maintained in a state that it floats to a predetermined height from the magnetic disk surface by an air current C generated between the disk surface and the disk facing surface 43 due to rotation of the magnetic disk 12. A direction of the air current C coincides with a rotational direction B of the magnetic disk 12. The slider 42 is arranged with respect to the surface of the magnetic disk 12 in such a manner that a longitudinal direction of the disk facing surface 43 substantially coincides with the direction of the air current C.

The slider 42 has a leading end 42a placed on an inflow side of the air current C and a trailing end 42b placed on an outflow side of the air current C. A leading step, a trailing step, a side step, a negative pressure cavity, and others which are not shown in the drawings are formed on the disk facing surface 43 of the slider 42.

As shown in FIG. 3 and FIG. 4, the head portion 44 has a reproducing head 54 and a recording head 56 formed at the trailing end 42b of the slider 42 in a thin-film process, and it is formed as a separation type magnetic head.

The reproducing head 54 is constituted of a magnetic film 50 which exercises a magneto-resistance effect and shield films 52a and 52b which are arranged on a trailing side and a leading side of this magnetic film to sandwich the magnetic film 50. The magnetic film 50 and lower ends of the shield films 52a and 52b are exposed on the disk facing surface 43 of the slider 42.

The recording head 56 is provided on the trailing end 42b side of the slider 42 with respect to the reproducing head 54. The recording head 56 has a main pole 66 made of a high magnetic permeability material which generates a recording magnetic field in a direction perpendicular to the surface of the magnetic disk 12, a trailing shield 62 (a return pole) 68 which is arranged on the trailing side of the main pole 66 and provided to efficiently close a magnetic path through the soft magnetic layer 23 immediately below the main pole, and a recording coil 71 which is arranged to wind around a magnetic path including the main pole 66 and the trailing shield 68 in order to flow a magnetic flux through the main pole 66 when writing a signal into the magnetic disk 12.

A power supply 70 is connected to the main pole 66 and the trailing shield 68, and a current circuit is constituted so that a current can be conducted from this power supply through the main pole 66 and the trailing shield 68 in series.

As shown in FIG. 3 to FIG. 6, the main pole 66 substantially perpendicularly extends with respect to the surface of the magnetic disk 12. An end portion 66a of the main pole 66 on the magnetic disk 12 side is narrowed to taper toward the disk surface. The end portion 66a of the main pole 66 has a cross section formed into, e.g., a rectangular shape, and an end surface of the main pole 66 is exposed on the disk facing surface 43 of the slider 42. In this embodiment, a width of the end portion 66a of the main pole 66 substantially corresponds to a width of the track of the magnetic disk 12.

The trailing shield 68 is formed into a substantially U-like shape, and its end portion 68a is formed into an elongated rectangular shape. An end surface of the trailing shield 68 is exposed on the disk facing surface 43 of the slider 42. A leading side end surface 68b of the end portion 68a extends along the width direction of each track of the magnetic disk 12. This leading side end surface 68b faces a trailing side end surface 67a of the main pole 60 in parallel to interpose a write gap WG therebetween.

The recording head 56 includes a high-frequency oscillator, e.g., a spin-torque oscillator 74 provided between the end portion 66a of the main pole 66 and the trailing shield 68. The spin-torque oscillator 74 is sandwiched between the trailing side end surface 67a of the end portion 66a of the main pole 66 and the leading side end surface 68b of the trailing shield 68, and it is arranged in parallel to end surfaces of these members. That is, the spin-torque oscillator 74 is placed in the range of the width of the main pole end portion along the track width direction in the write gap WG and arranged at a position including a center line of the main pole 66.

The spin-torque oscillator 74 has an end exposed on the ABS surface and it is provided at the same height position as the end surface of the main pole 66 with respect to the surface of the magnetic disk 12. When a voltage is applied to the main pole 66 and the trailing shield 68 from the power supply 70 under control of the control circuit board 25, direct-current electricity is applied to the spin-torque oscillator 74 in a film thickness direction. When energization is performed, magnetization of an oscillation layer in the spin-torque oscillator 74 is rotated, thereby generating a high-frequency magnetic field. As a result, the high-frequency magnetic field is applied to the recording layer of the magnetic disk 12. In this manner, the trailing shield 68 and the main pole 66 function as an electrode that perpendicularly energizes the spin-torque oscillator 74.

As shown in FIG. 3 and FIG. 4, the trailing shield 68 has a coupling portion 65 which is close to the upper portion of the main pole 66 in the write gap WG, i.e., at a position apart from the disk facing surface of the slider. This coupling portion 65 is coupled with the main pole 66 through a back gap portion 67 formed of an insulator such as $SiO_2$. This insulator achieves electrical insulation of the main pole 66 and the trailing shield 68. When the back gap portion 67 is made of the insulator in this manner, a current can be efficiently applied to the spin-torque oscillator 74 from the power supply 70 through the main pole 66 and the trailing shield 68 which also serve as the electrode of the spin-torque oscillator 74. As the insulator of the back gap portion 67, it is possible to use $Al_2O_3$ besides $SiO_2$.

The back gap portion 67 may be made of a semiconductor such as Si or Ge. An electrical conductor may be contained in a part of the back gap portion 67 made of the insulator or the semiconductor to electrically connect the main pole 66 to the trailing shield 68. When such a configuration is adopted, since electrostatic discharge during a process treatment occurs through the back gap portion 67, the spin-torque oscillator 74 can be prevented from being damaged during the manufacturing process, thereby improving a process yield. Further, a sufficient current can be applied to the spin-torque oscillator 74 by setting electrical resistance in the back gap portion 67 to be equal to or above electrical resistance in the spin-torque oscillator 74.

As shown in FIG. 5 and FIG. 6, the spin-torque oscillator 74 is constituted by sequentially laminating from the main pole 66 side toward the trailing shield 68 side, e.g., an underlying layer 74a formed of a Ta/Ru laminated film, a spin-injection layer (a second magnetic material layer) 74b formed of an artificial lattice film with a film thickness of 12 nm obtained by laminating Co/Ni 15 times, a Cu intermediate layer 74c with a film thickness of 2 nm, an oscillation layer (a first magnetic material layer) 74d formed of an FeCoAl magnetic film with a film thickness of 15 nm, and a cap layer 74e formed of a Cu/Ru laminated film.

Furthermore, the underlying layer 74a and the cap layer 74e are connected to the main pole 66 and the trailing shield 68 which also serve as the electrode, respectively. It is preferable for a length WT2 of the spin-torque oscillator 74 in the track width direction to be equal to or smaller than a length WT1 of the trailing side end surface 67a of the main pole 66 in the track width direction.

Coercive force of the oscillation layer 74d is smaller than a magnetic field applied from the main pole 66, and coercive force of the spin injection layer 74b is smaller than a magnetic field applied from the main pole 66.

A soft magnetic material is desirable as a material of the oscillation layer 74d, there is used an alloy containing at least one of Ni, Fe, and Co such as NiFe, FeCoSi, FeNiCo, CoFe, or FeSi besides FeCoAl, an artificial lattice magnetic layer obtained by laminating an alloy containing at least one of Ni, Fe, and Co such as FeCo/Ni, Fe/Ni, or Fe/Co, or a Whistler alloy such as CoMnSi, CoFeMnSi, CoFeAlSi, CoMnAl, CoMnGaSn, CoMnGaGe, CoCrFeSi, or CoFeCrAl.

A material having perpendicular magnetic anisotropy is desirable as a material of the spin injection layer 74b, and it is possible to appropriately use a material superior in perpendicular magnetic anisotropy, e.g., a CoCr-based magnetic layer such as CoCrPt, CoCrTa, CoCrTaPt, or CoCrTaNb, or an RE-TM-based amorphous alloy magnetic layer such as TbFeCo, an artificial lattice magnetic layer of a Co alloy and an alloy using a platinum group element, e.g., Pd, Pt, or Ni such as Co/Pd, Co/Pt, CoCrTa/Pd, Co/Ni, or Co/NiPt, a CoPt-based or FePt-based alloy magnetic layer, or an SmCo-based alloy magnetic layer.

Moreover, the oscillation layer 74d may have a configuration obtained by laminating a soft magnetic material and a perpendicular magnetic anisotropic material used for the spin injection layer. Adopting this configuration enables adjusting the perpendicular magnetic anisotropy of the evened oscillation layer, thereby realizing optimum oscillation.

The spin injection layer 74b may be formed by laminating a material having high spin polarizability on an interface between itself and the intermediate layer 74c. For example, it is possible to adopt a configuration obtained by laminating an FeCo-based alloy such as FeCo or FeCoAl, a Whistler alloy such as CoMnSi, CoFeMnSi, CoFeAlSi, CoMnAl, CoMnGaSn, CoMnGaGe, CoCrFeSi, or CoFeCrAl, and a material having perpendicular magnetic anisotropy. Using this configuration enables improving spin-torque efficiency from the spin injection layer 74b, which is advantages to reduction of an applied current density.

A material having a long spin diffusion length is desirable as a material of the intermediate layer 74c, and it is possible to use a noble metal such as Cu, Pt, Au, Ag, Pd, or Ru or a non-magnetic transition metal such as Cr, Rh, Mo, or W. Additionally, the intermediate layer 74c may have a current confining structure made of an alumina base material and Cu or of an alumina base material and an NiFe alloy.

It is desirable to set an element size (a size of a cross section cutting across a plane perpendicular to a laminating direction) of the spin-torque oscillator 74 to a 10-nm square to a 100-nm square. An element shape is not restricted to a rectangular parallelepiped shape, and a cylindrical shape or a hexagonal columnar shape may be adopted. However, materials used for the oscillation layer 74d, the spin injection layer 74b, and the intermediate layer 74c and sizes of these layers can be arbitrarily selected without being restricted the above-described size.

It is to be noted that the spin injection layer 74b, the intermediate layer 74c, and the oscillation layer 74d are sequentially laminated, but the oscillation layer, the intermediate layer, and the spin injection layer may be laminated in the mentioned order. In this case, a distance between the main pole 66 and the oscillation layer 74d is reduced, and the range that a recording magnetic field generated by the main pole 66 is efficiently superimposed on a high-frequency magnetic field generated by the oscillation layer is widened on the medium, thereby enabling excellent recording.

In this embodiment, the oscillation layer 74d of the spin-torque oscillator 74 is segmented or divided into a plurality of oscillation regions. Fore example, a slit 80 (or a notch) having a depth equal to the film thickness of the oscillation layer 74d is formed at a substantially central part of the oscillation layer 74d, and this slit 80 extends in parallel to the surface of the magnetic disk 12. This slit 80 divides the oscillation layer 74d into two oscillation regions 82a and 82b aligned along a direction perpendicular to the surface of the magnetic disk 12 to interpose a gap therebetween.

The slit 80 or the notch is formed by performing etching to remove the oscillation layer from the surface side of the oscillation layer based on, e.g., ion milling or RIE after film formation of the oscillation layer 74d. After forming the slit 80 or the notch, it is filled with, e.g., the cap layer 74e. Further, it may be filled with an insulator such as SiO2 or Al2O3 or a semiconductor such as Si or Ge. When the slit 80 or the notch is filled with such an insulator or semiconductor, a current is concentrated on the oscillation regions 82a and 82b, thus effecting oscillation with a lower voltage. It is to be noted that the slit 80 or the notch is not restricted to the strip-like shape, and it may be formed into a bent or crossed shape or a shape that is not opened to a side edge of the oscillation layer.

When the oscillation layer 74d of the spin-torque oscillator 74 is divided into oscillation regions in this manner, the spin-torque oscillator 74 can oscillate with a lower driving voltage, and it can also oscillate with a large amplitude, thereby increasing a generated high-frequency magnetic field. When the sufficient high-frequency magnetic field is generated, the sufficient recording capability can be exercised, and stable recording characteristics can be realized.

Figure 7:
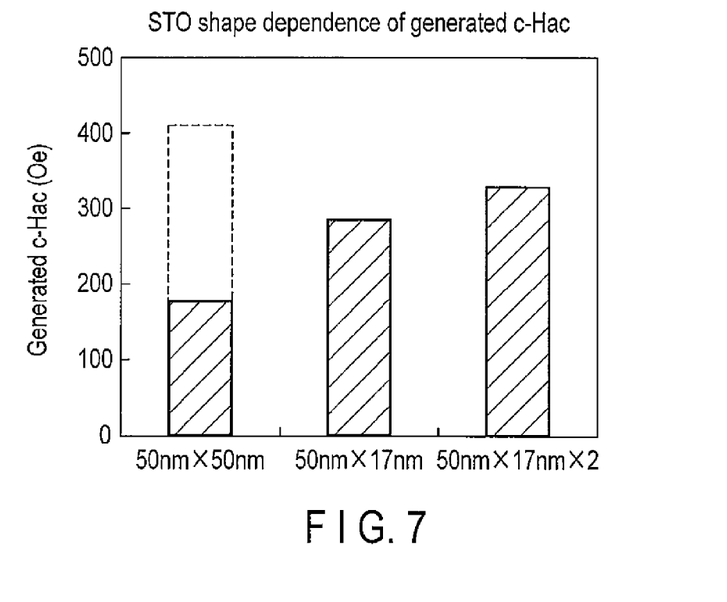
FIG. 7 is a view showing a relationship between circularly-polarized high-frequency magnetic field intensity (c-Hac) generated from the spin-torque oscillator and a shape and a dimension of the spin-torque oscillator.

FIG. 7 shows a relationship between circularly-polarized high-frequency magnetic field intensity (c-Hac) generated from the spin-torque oscillator and a shape and a dimension of the spin-torque oscillator. When the spin-torque oscillator 74 having an element size of 50 nm×50 nm is created, c-Hac of 410 (Oe) can be produced if excellent oscillation is carried out, but oscillation of approximately 180 (Oe) is actually difficult. It can be considered the oscillation is difficult because a spin wave is excited on the oscillation layer 74d and energy is greatly lost. Further, since an element having an element size of 50 nm×17 nm is small in element size, the excitation of a spin wave is suppressed, and hence the oscillation becomes excellent. However, since the element size is small, the generated c-Hac is just 290 (0e).

In this embodiment, since the oscillation layer 74d is divided into the oscillation regions 81a and 82b, it is equivalent to a configuration having two elements each having a size of 50 nm×17 nm on upper and lower sides, and the generated c-Hac becomes 330 (Oe) as shown in FIG. 7. Therefore, according to this embodiment, it can be understood that an oscillation amplitude of the oscillation layer 74d can be increased with a lower driving voltage and the circularly-polarized high-frequency magnetic field intensity generated from the spin-torque oscillator 74 is raised. As a result, good high-frequency assist recording is enabled. It is to be noted that the generated c-Hac is a value measured on the magnetic disk surface immediately below the spin-torque oscillator 74.

According to the thus-configured HDD, when the VCM 16 is driven, the head actuator 14 is rotationally moved, and the magnetic head 33 is moved onto and positioned on a desired track of the magnetic disk 12. Further, the magnetic head 33 floats by an air current C generated between the disk surface and the disk facing surface 43 by the rotation of the magnetic disk 12. At the time of operations of the HDD, the disk facing surface 43 of the slider 42 faces the disk surface while keeping a gap therebetween. As shown in FIG. 2, the magnetic head 33 floats in an inclined posture that enables the closet approach of recording head 56 of the head portion 44 to the surface of the magnetic disk 12. In this state, the reproducing head 54 is used to read recorded information from the magnetic disk 12, and the recording head 56 is used to write information into the magnetic disk 12.

In writing of information, direct-current electricity is flowed through the spin-torque oscillator 74 to generate a high-frequency magnetic field, and this high-frequency magnetic field is applied to the perpendicular magnetic recording layer 22 of the magnetic disk 12. Further, when the recording coil 71 excites the main pole 66 and this main pole applies a perpendicular recording magnetic field to the recording layer 22 of the magnetic disk 12 provided immediately below, information is recorded with a desired track width. When the high-frequency magnetic field is superimposed on the recording magnetic field, magnetic recording with high retaining force and high magnetic anisotropic energy can be performed. Furthermore, when the oscillation layer 74d of the spin-torque oscillator 74 is divided into the independent oscillation regions, the generated high-frequency magnetic field of the spin-torque oscillator can be increased, the sufficient recording capability can be exercised, and the stable recording characteristics can be obtained. As a result, it is possible to obtain the magnetic recording head that enables good recording with improved recording signal quality and the HDD provided with this magnetic recording head.

Figure 8A:
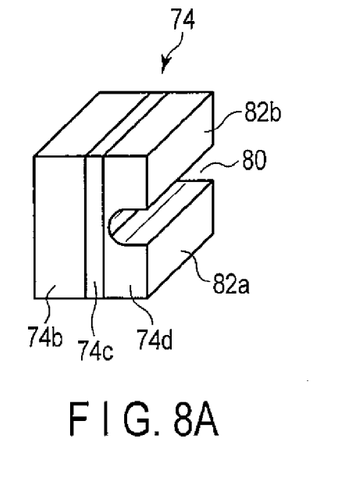
FIG. 8A, FIG. 8B, and FIG. 8C are perspective views showing spin-torque oscillators according to first, second, and third modifications, respectively.
Figure 8B:
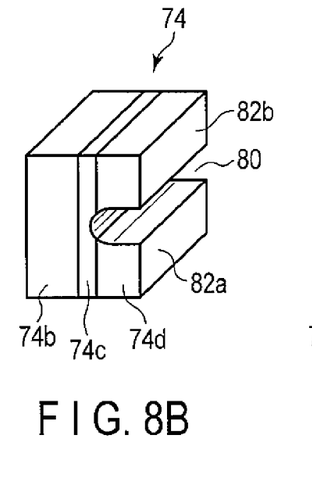
Figure 8C:
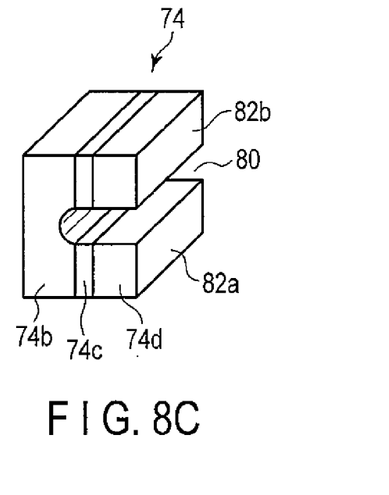

It is to be noted that the oscillation layer 74d may be completely divided by the slit 80 or the notch like the first embodiment, or a part of this layer may remain like a first modification depicted in FIG. 8A. That is, the slit 80 or the notch may be formed to be shallower than the film thickness of the oscillation layer 74d. Moreover, like a second modification depicted in FIG. 8B, the slit 80 or the notch may be deeply formed to divide a part of the intermediate layer 74c. Like a third modification depicted in FIG. 8C, the slit 80 or the notch may be further deeply formed so that it pierces through the oscillation layer 74d and the intermediate layer 74c to reach the spin injection layer 74b. In this case, the intermediate layer 74c is also completely divided.

Figure 9A:
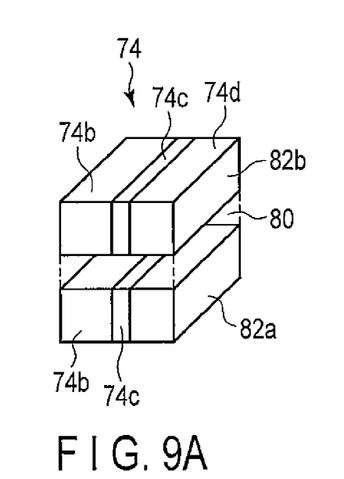
FIG. 9A, FIG. 9B, and FIG. 9C are perspective views showing spin-torque oscillators according to fourth, fifth, and sixth modifications.

Like a fourth modification depicted in FIG. 9A, the slit 80 or the notch may be formed to pierce through the oscillation layer 74d, the intermediate layer 74c, and the spin injection layer 74b. In this case, the oscillation layer 74d, the intermediate layer 74c, and the spin injection layer 74b are completely divided into pieces by the slit 80, respectively.

Figure 9B:
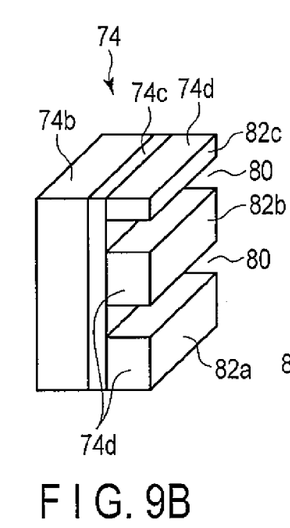
Figure 9C:
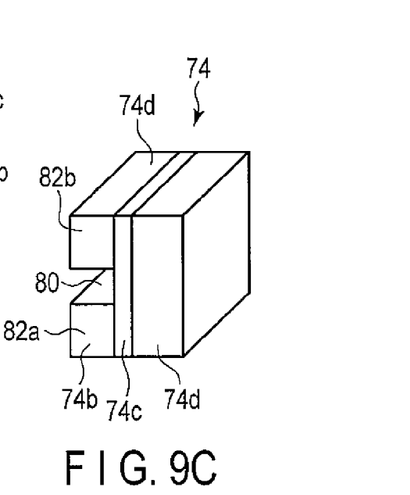

Like a fifth modification shown in FIG. 9B, the oscillation layer 74d is not restricted to the two regions, and it may be divided into three or more oscillation regions by slits or notches. Like a sixth modification shown in FIG. 9C, the oscillation layer 74d, the intermediate layer 74c, and the spin injection layer 74b may be laminated from the main pole 66 side in the mentioned order. In this case, a distance between the main pole 66 and the oscillation layer 74d is reduced, and the range where a recording magnetic field generated by the main pole 66 and a high-frequency magnetic field produced by the oscillation layer are efficiently superimposed is widened on the medium, thereby enabling good recording.

It is to be noted that, as illustrated in the first embodiment and the first, second, fifth, and sixth modifications, when the spin injection layer 74b is configured to remain as a complete layer without being divided, a reaction involved by the oscillation of the oscillation layer 74d can suppress the oscillation of the spin injection layer 74b and the oscillation layer 74d can be more stably oscillated.

In regard to a film thickness of the divided portion, i.e., a depth of the slit 80 or the notch in the above-described various kinds of spin-torque oscillators, a coupling constant of spin waves in the divided oscillation regions is obtained, and the obtained constant represents the film thickness of the oscillation layer in the divided portion.

It is assumed that an amplitude of magnetization of a magnetic material changes with time as follows:

$$m = m_0 \times \exp(-t/\tau)$$

When a relaxation time $\tau$ of the amplitude of the magnetic material is obtained based on Gilbert formula, the following expression can be obtained as rough approximation:

$$\tau = 1/\alpha\bar{\omega}$$

Here, $\alpha$ is a damping constant, and $\omega$ is a resonant angular velocity (a reference literature: Basics of Magnetic Engineering II, P 342, Keizo Ohta, KYORITSU SHUPPAN Co., Ltd.).

When this expression is applied to the spin wave to obtain a relaxation length $\lambda_0$ of the spin wave which is obtained as a product of the relaxation time and a group velocity, the following expression can be acquired:

$$\lambda_0 = 2/\alpha k$$
$$= \lambda/(\alpha\pi)$$

where k is a wave number of the spin wave, and $\lambda$ is a wavelength of the spin wave.

When this expression is applied to the spin wave to obtain a coupling constant of the spin wave in each of the oscillation regions of the oscillation layer, the coupling constant C is represented as follows:

$$C = Ms_1 t / Ms T^{\exp(-l/\lambda_0)}$$
$$= Ms_1 t / Ms T^{\exp(-\alpha\pi l/\lambda)}$$

That is, this expression represents that the spin wave generated in the oscillation layer in the one undivided portion is damped when passing through the oscillation layer in the divided portion and the amplitude of the spin wave is reduced when the spin wave flows into the oscillation layer in the other undivided portion. Here, T is a film thickness of the oscillation layer in the undivided portion, Ms is saturated magnetization in the undivided portion, t is a film thickness of the oscillation layer in the divided portion, Ms1 is saturated magnetization in the divided portion, and l is a length of the oscillation layer in the divided portion.

Now, taking into account a situation that a wavelength of the spin wave to consider is in the same range as the element size and corresponds to the damping constant $\alpha$ to approximately 0.01, the wavelength is $\alpha l/k$ to 0. Therefore, in the above case, the coupling constant C is as follows like the rough approximation:

$$C = Ms_1 t / Ms T$$

That is, when the spin wave in the one undivided oscillation layer is transferred to the other divided oscillation layer, the amplitude is reduced to C=t/T.

It is known that energy loss of the spin wave is proportionate to a square of the amplitude. Energy injection using spin torque is proportionate to a driving current of the spin-torque oscillator. In general, a variation in driving current required for oscillation is approximately 20%, and an increase/decrease of 20% can be included in the range of the variation. Therefore, it is desirable to include the energy loss of the spin wave due to presence of the oscillation layer in the divided portion into the range of 20%. When the saturated magnetization of the oscillation layer in the divided portion is substantially equal to the saturated magnetization of the oscillation layer in the undivided portion, it is preferable to set the amplitude of the spin wave to 40% or below. That is, it is desirable to set the film thickness t of the divided portion to 45% or below of the film thickness T of the undivided portion.

It is to be noted that, likewise, when the saturated magnetization of the oscillation layer in the divided portion is substantially equal to the saturated magnetization of the oscillation layer in the undivided portion and the variation in driving current required for oscillation is approximately 10%, it is desirable to set a ratio of the film thickness t of the divided portion and the film thickness T of the undivided portion to 32% or below. Furthermore, when the variation in driving current required for oscillation is approximately 30%, it is preferable to set a ratio of the film thicknesses to 63% or below.

Figure 10:
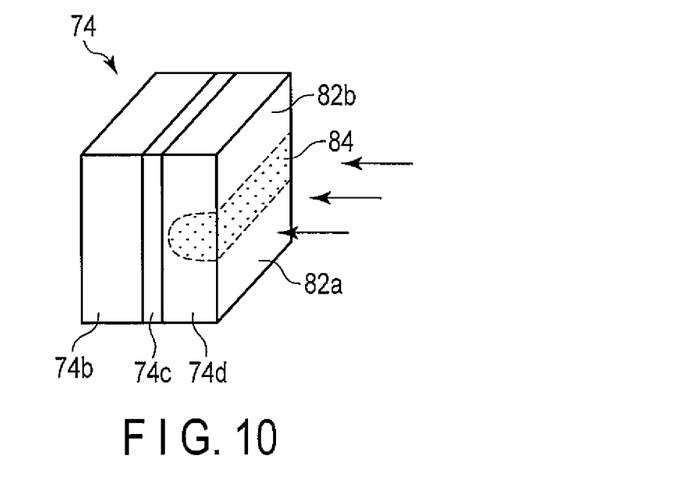
FIG. 10 is a perspective view showing a spin-torque oscillator according to a seventh modification.

Like a seventh modification shown in FIG. 10, the oscillation layer 74d may be divided into pieces by an inactive region 84 in place of the slit or the notch. That is, ions of, e.g., N2, phosphorous, or helium may be implanted into the oscillation layer 74d from one surface side thereof by using a mask to deactivate magnetization of portions other than the mask portion. The strip-like inactive region 84 deactivated by implantation of the ions is provided, and the oscillation layer 74d is divided into a plurality of, e.g., two oscillation regions 82a and 82b on upper and lower sides by this inactive region 84. The shape of the inactive region 84 is not restricted to the strip-like shape, and a bent or crossed shape may be adopted.

When the inactive region 84 is used, the film thickness of the oscillation layer 74d in the divided portion is equal to the film thickness of the oscillation layer in the undivided portion, and the saturated magnetization Ms is lowered. In this case, when the variation in driving current required for oscillation is approximately 20%, it is desirable to set a ratio of the saturated magnetization Ms1 in the divided portion and the saturated magnetization Ms in the undivided portion to 45% or below.

A description will now be given as to a magnetic recording head of an HDD according to another embodiment. It is to be noted that, in another embodiment described below, like reference numerals denote parts equal to those in the first embodiment to omit a detailed description thereof, and parts different from those of the first embodiment will be mainly explained in detail.

Second Embodiment

Figure 11:
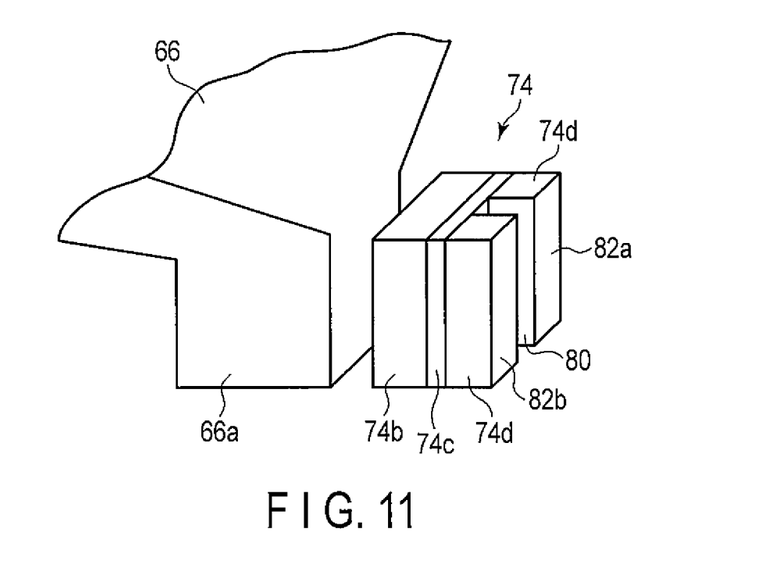
FIG. 11 is a perspective view showing a main pole end portion and a spin-torque oscillator of a recording head in an HDD according to a second embodiment.

FIG. 11 schematically shows a recording head in a magnetic head of an HDD according to a second embodiment. According to this embodiment, oscillation regions 82a and 82b of an oscillation layer 74d in a spin-torque oscillator 74 are aligned to interpose a gap in a direction of a track width of a main pole 66. For example, a slit 80 (or a notch) having a depth equal to a film thickness of the oscillation layer 74d is formed at a substantially central part of the oscillation layer 74d, and this slit 80 extends in a direction perpendicular to a surface of a magnetic disk 12. The oscillation layer 74d is divided by this slit 80 into the two oscillation regions 82a and 82b which are aligned in a direction parallel to the surface of the magnetic disk 12 to interpose a gap therebetween.

The slit 80 or the notch is formed by forming the oscillation layer 74d and then performing etching to remove the oscillation layer from the surface side of the oscillation layer based on, e.g., ion milling or RIE. The slit 80 or the notch is filled with, e.g., a cap layer 74e after formation.

When the oscillation layer 74d in the spin-torque oscillator 74 is divided into the oscillation regions in this manner, the spin-torque oscillator 74 can oscillate with a lower driving voltage, and it can oscillate with a large amplitude, thereby increasing a generated high-frequency magnetic field. When the sufficient high-frequency magnetic field is generated, the sufficient recording capability can be exercised, and stable recording characteristics can be realized.

Figure 12:
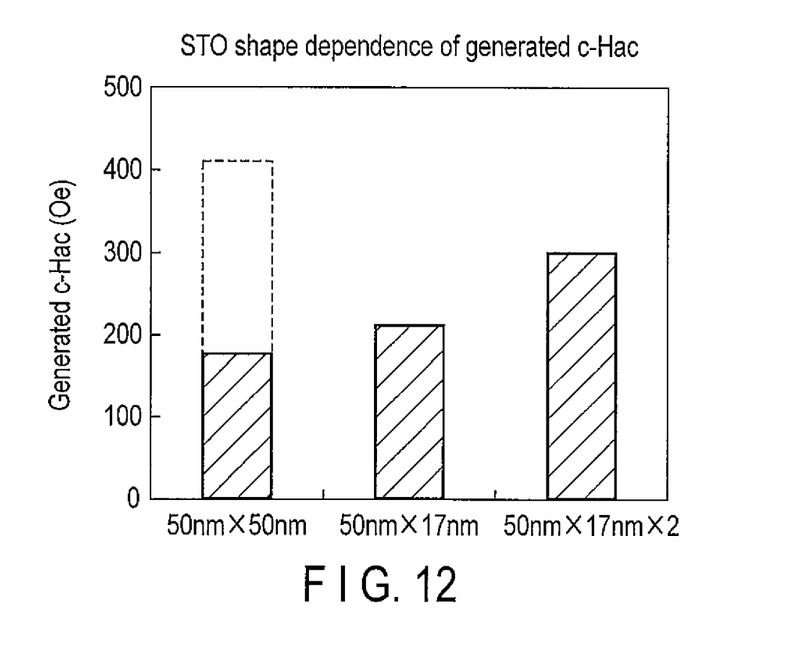
FIG. 12 is a view showing a relationship between circularly-polarized high-frequency magnetic field intensity (c-Hac) generated from the spin-torque oscillator and a shape and a dimension of the spin-torque oscillator according to the second embodiment.

FIG. 12 shows a relationship between circularly-polarized high-frequency magnetic field intensity (c-Hac) generated from the spin-torque oscillator and a shape and a dimension of the spin-torque oscillator. When the spin-torque oscillator 74 having an element size of 50 nm×50 nm is created, c-Hac of 410 (Oe) can be produced if excellent oscillation is carried out, but oscillation of just 180 (Oe) is actually performed. Further, since an element having an element size of 50 nm×17 nm is small in element size, the excitation of a spin wave is suppressed, and hence the oscillation becomes excellent. However, since the element size is small, the generated c-Hac is just 290 (Oe).

In this embodiment, since the oscillation layer 74d is divided into the oscillation regions 82a and 82b, it is equivalent to a configuration having two elements each having a size of 50 nm×17 nm on left and right sides, and the generated c-Hac becomes 330 (Oe) as shown in FIG. 12. Therefore, according to this embodiment, it can be understood that an oscillation amplitude of the oscillation layer 74d can be increased with a lower driving voltage and the circularly-polarized high-frequency magnetic field intensity generated from the spin-torque oscillator 74 is raised. As a result, good high-frequency assist recording is enabled.

Third Embodiment

Figure 13:
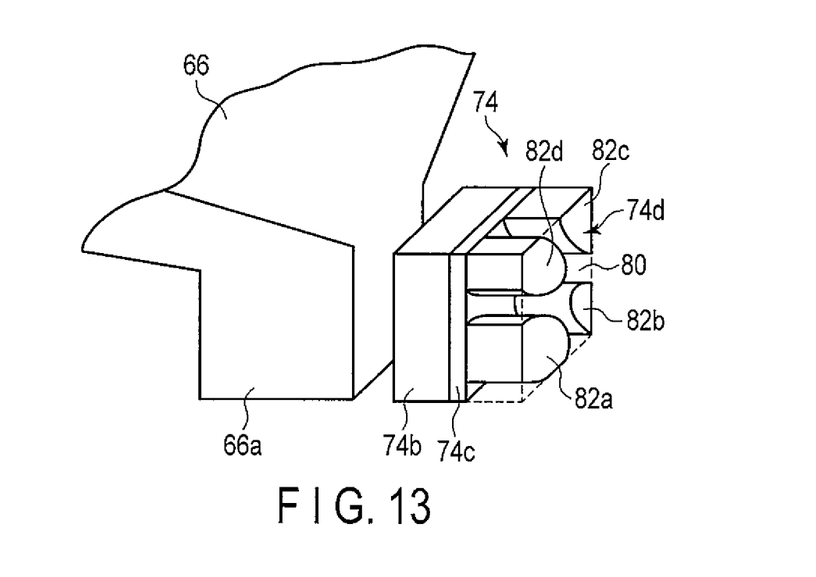
FIG. 13 is a perspective view showing a main pole end portion and a spin-torque oscillator of a recording head in an HDD according to a third embodiment.

FIG. 13 schematically shows a recording head in a magnetic head of an HDD according to a third embodiment. According to this embodiment, an oscillation layer 74d of a spin-torque oscillator 74 is divided into three or more independent oscillation regions 82a, 82b, 82c, and 82d. Here, the oscillation regions 82a, 82b, 82c, and 82d of the oscillation layer 74d are aligned in a direction perpendicular to a surface of the magnetic disk and a direction parallel to the same surface at random intervals. For example, a slit 80 (or a notch) having a depth equal to a film thickness of the oscillation layer 74d is formed to cut across the oscillation layer 74d in directions, and the oscillation layer 74d is divided into the four oscillation regions 82a, 82b, 82c, and 82d by this slit 80.

Figure 14:
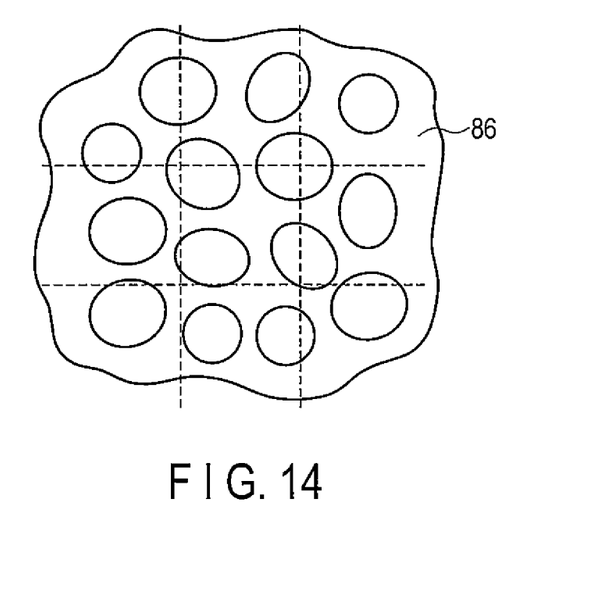
FIG. 14 is a plan view schematically showing a mask used when processing an oscillation layer of the spin-torque oscillator in the third embodiment.

FIG. 14 shows a mask 86 for forming the slit 80 in the oscillation layer 74d. As this mask 86, a mask utilizing a self-assembled material can be used. It is possible to use the self-assembled material of an organic matter such as PS-BS or an inorganic matter such as Al—Si. When dividing the oscillation layer 74d into the oscillation regions, etching may be performed to remove a magnetic material by, e.g., ion milling using the mask 86 or RIE, or ions of, e.g., N2, phosphorous, or helium may be implanted by using this mask to deactivate magnetic properties in portions other than the mask portion.

When the oscillation layer 74d of the spin-torque oscillator 74 is divided into the oscillation regions in this manner, the spin-torque oscillator 74 can oscillate with a lower driving voltage, and it can oscillate with a large amplitude, thereby increasing a generated high-frequency magnetic field. When the sufficient high-frequency magnetic field is generated, the sufficient recording capability can be exercised, and stable recording characteristics can be realized.

According to the above-described various embodiments and modifications, there can be provided the magnetic recording head that can increase the generated high-frequency magnetic field, exercise the sufficient recording capability, and realize the stable recording characteristics and the disk drive provided with this magnetic recording head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:
   a magnetic pole configured to apply a recording magnetic field;
   a write shield opposed to the magnetic pole with a write gap between the magnetic pole and the write shield; and
   a high-frequency oscillator between the magnetic pole and the write shield in a range of a width of the magnetic pole, the high-frequency oscillator configured to generate a high-frequency magnetic field,
   wherein the high-frequency oscillator comprises a spin injection layer, an intermediate layer, and an oscillation layer, which are laminated in a laminating direction, and at least the oscillation layer comprises a surface perpendicular to the laminating direction, a slit or a notch formed in the surface of the oscillation layer to pierce the oscillation layer and the intermediate layer and formed in a part of the spin injection layer without piercing the spin injection layer, and two oscillation regions divided by the slit or the notch, the slit or the notch extends in parallel to an air bearing surface of the recording head, and the two oscillation regions of the oscillation layer are aligned one above the other in a direction perpendicular to the air bearing surface of the recording head with the slit or the notch between the two oscillation regions, and one of the two oscillation regions is exposed in the air bearing surface and the other oscillation region is apart from the air bearing surface in the direction perpendicular to the air bearing surface.

2. The magnetic recording head of claim 1, wherein the high-frequency oscillator is arranged at a position including a center line of the magnetic pole.

3. A disk drive comprising:
a disk-shaped recording medium comprising a recording layer;
a driver configured to rotate the disk-shaped recording medium; and
a magnetic recording head configured to perform information processing with respect to the disk-shaped recording medium, the magnetic recording head comprising:
a magnetic pole configured to apply a recording magnetic field to the recording layer of the disk-shaped recording medium;
a write shield opposed to the magnetic pole with a write gap between the magnetic pole and the write shield; and
a high-frequency oscillator between the magnetic pole and the write shield in a range of a width of the magnetic pole in a track width direction, the high-frequency oscillator configured to generate a high-frequency magnetic field, wherein the high-frequency oscillator comprises a spin injection layer, an intermediate layer, and an oscillation layer, which are laminated in a laminating direction, and at least the oscillation layer comprises a surface perpendicular to the laminating direction, a slit or a notch formed in the surface of the oscillation layer to pierce the oscillation layer and the intermediate layer and formed in a part of the spin injection layer without piercing the spin injection layer, and two oscillation regions divided by the slit or notch, the slot or the notch extends in parallel to an air bearing surface of the recording head, and the two oscillation regions of the oscillation layer are aligned one above the other in a direction perpendicular to the air bearing surface with the slit or the notch between the two oscillation regions, and one of the two oscillation regions is exposed in the air bearing surface and the other oscillation region is apart from the air bearing surface in the direction perpendicular to the air bearing surface.

4. The disk drive of claim 3, wherein the high-frequency oscillator is arranged at a position including a center line of the magnetic pole.

* * * * *